(12) United States Patent
Schneider (10) Patent No.: US 8,585,084 B1
(45) Date of Patent: Nov. 19, 2013

(54) BELT INTEGRATED AIRBAG (71) Applicant: Autoliv ASP, Inc., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/709,132

(22) Filed: Dec. 10, 2012

(51) Int. Cl.
*B60R 21/18* (2006.01)

(52) U.S. Cl.
USPC ........................................ 280/733; 280/743.2

(58) Field of Classification Search
USPC ....................................... 280/729, 733, 743.2
See application file for complete search history.

(56) References Cited

U.S. PATENT DOCUMENTS

| | | | | |
|---|---|---|---|---|
| 3,865,398 A * | 2/1975 | Woll | | 280/733 |
| 3,948,541 A * | 4/1976 | Schulman | | 280/733 |
| 4,342,483 A * | 8/1982 | Takada | | 297/488 |
| 5,162,006 A * | 11/1992 | Yandle, II | | 441/96 |
| 5,863,065 A * | 1/1999 | Boydston et al. | | 280/733 |
| 6,237,945 B1 * | 5/2001 | Aboud et al. | | 280/733 |
| 6,293,582 B1 * | 9/2001 | Lewis | | 280/735 |
| 6,705,641 B2 * | 3/2004 | Schneider et al. | | 280/733 |
| 7,665,761 B1 * | 2/2010 | Green et al. | | 280/733 |
| 7,669,891 B2 * | 3/2010 | Azuma et al. | | 280/733 |
| 7,980,590 B2 * | 7/2011 | Foubert et al. | | 280/733 |
| 8,104,790 B2 * | 1/2012 | Nezaki | | 280/733 |
| 8,308,190 B2 * | 11/2012 | Smith et al. | | 280/733 |
| 2002/0011723 A1 * | 1/2002 | Lewis | | 280/735 |

\* cited by examiner

*Primary Examiner* — Joseph Rocca
*Assistant Examiner* — Robert A Coker
(74) *Attorney, Agent, or Firm* — Harness, Dickey & Pierce, P.L.C.

(57) ABSTRACT

A restraint system for a seat is provided and may include a belt portion having an inflatable portion movable from a pre-deployed state to an inflated state. The inflatable portion may include a first surface opposing an occupant when in the inflated state and a second surface facing away from the occupant when in the inflated state. The first surface and the second surface may be formed at an angle relative to one another.

23 Claims, 9 Drawing Sheets

BELT INTEGRATED AIRBAG

FIELD

The present disclosure relates to a seatbelt and more particularly to a seatbelt having an inflatable portion.

BACKGROUND

This section provides background information related to the present disclosure which is not necessarily prior art.

Mobile platforms such as vehicles typically include one or more airbags that work in conjunction with one another and with other safety systems to absorb or otherwise dissipate energy associated with an impact event away from occupants of the mobile platform. For example, airbags may be located within a steering wheel, an instrument panel, a roof rail, and/or seat assemblies of a vehicle. The various airbags work in conjunction with one another and with other vehicle-safety systems such as cross-car beams, seatbelts, and pre-tensioning devices to properly manage energy associated with an impact event and to improve occupant safety.

While the foregoing components work in conjunction with one another and are often sequenced to perform at different times during an impact event, the various components are separate and, as such, are typically positioned at different locations within the vehicle. Further, while the foregoing components adequately protect vehicle occupants, many of the safety systems cannot be easily incorporated into non-automotive applications. For example, frontal airbags typically disposed within a steering wheel and/or an instrument panel of a vehicle and side-curtain airbags typically disposed within a roof rail or pillar of a vehicle cannot readily be incorporated into an aircraft application or other mobile platforms that don't include similar structure. As a result, airbags and related safety systems are typically application-specific and, therefore, must be specifically designed for the particular mobile platform (i.e., automotive vehicle, train, bus, aircraft, etc.) and associated structure.

Recently, however, airbags have been incorporated into seat structures and related components that are common to mobile platforms in an effort to utilize a common airbag across various mobile platforms and to provide an airbag at each seating location. Namely, airbags have recently been incorporated into seatbacks of mobile platforms and/or have been mechanically attached to the webbing of seatbelts at an outer surface thereof to allow the airbag to be used in a variety of mobile platforms without requiring mounting of the airbag in the surrounding structure of the particular mobile platform. Mounting an airbag in a seatback or on a seatbelt obviates the need to support the airbag in a surrounding structure of a mobile platform such as a steering wheel, instrument panel, or bulkhead and, further, allows the airbag to be used across various mobile platforms and at each seating location of the mobile platforms without regard to the surrounding structure.

Conventional airbag assemblies that are attached to the webbing of a seatbelt are typically movable from a pre-deployed state to an inflated state and are positioned relative to a vehicle occupant to absorb energy associated with a front impact event. For example, a seat assembly associated with an aircraft may incorporate a seatbelt having an inflatable portion that partially fills a void between an occupant and a seatback of another seat assembly located in front of the occupant. Positioning the inflatable portion in this void causes the occupant to load or contact the inflated airbag instead of the seatback or other surrounding structure. As such, the airbag serves to dissipate the energy associated with forward movement of the occupant caused by the aircraft experiencing a front-impact event.

While seatbelts incorporating inflatable portions absorb energy associated with front-impact events, such inflatable portions typically include a large volume to adequately fill the void between the occupant and the surrounding structure of the mobile platform. Accordingly, conventional seatbelts incorporating an inflatable portion are often bulky and require use of a large inflator to sufficiently and quickly move the inflatable portion from a pre-deployed state to an inflated state. Requiring use of a high-volume inflatable portion and associated large inflator adds to the overall cost, size, and weight of the overall assembly. As a result, the overall cost, size, and weight of the mobile platform is likewise increased.

SUMMARY

This section provides a general summary of the disclosure, and is not a comprehensive disclosure of its full scope or all of its features.

A restraint system for a seat is provided and may include a belt portion having an inflatable portion movable from a pre-deployed state to an inflated state. The inflatable portion may include a first surface opposing an occupant when in the inflated state and a second surface facing away from the occupant when in the inflated state. The first surface and the second surface may be formed at an angle relative to one another.

In another configuration, a restraint system for a seat is provided and may include a belt portion having an inflatable portion movable from a pre-deployed state to an inflated state. The inflatable portion may include at least one tether disposed at a junction of a first surface that opposes an occupant when in the inflated state and a second surface that faces away from the occupant when in the inflated state. The at least one tether may cause the inflatable portion to bend at the junction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a restraint device 10 is provided and may include a latch mechanism 12, a first segment 14, and a second segment 16. The latch mechanism 12 may be disposed between the first segment 14 and the second segment 16 and may be movable between an unlatched state permitting separation of the first segment 14 and the second segment 16 and a latched state joining the first segment 14 and second segment 16.

Figure 1:
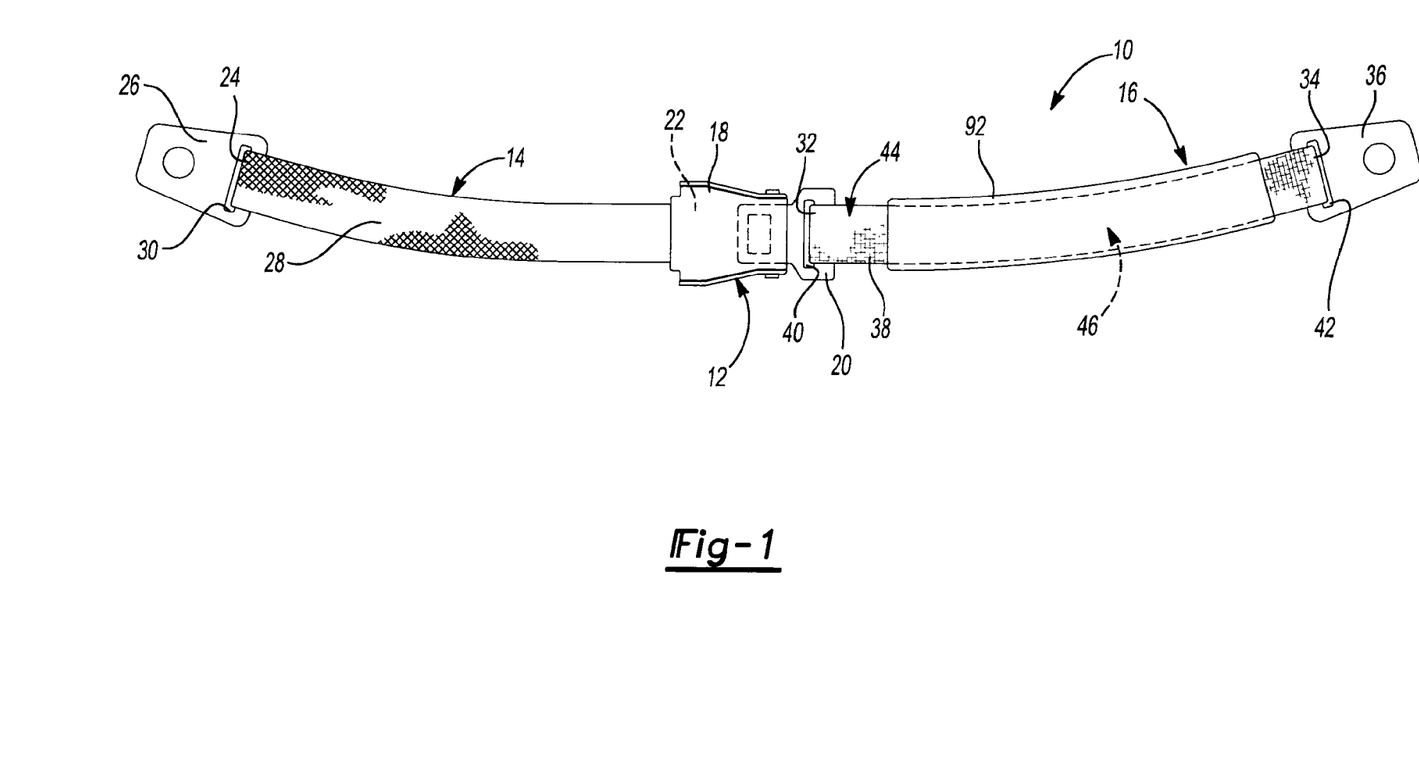
FIG. 1 is a front view of a restraint device in accordance with the principles of the present disclosure.

The latch mechanism 12 may include a buckle 18 and a tongue 20 that cooperate to selectively attach the first segment 14 and the second segment 16. Specifically, the buckle 18 may include an opening (not shown) that partially receives a portion of the tongue 20 to releasably couple the tongue 20 to the buckle 18 (FIG. 1). Coupling the tongue 20 to the buckle 18 likewise couples the first segment 14 to the second segment 16, as shown in FIG. 1. The first segment 14 and second segment 16 may be separated when a force is applied to the buckle 18 to disengage the tongue 20 from the buckle 18. The buckle 18 and tongue 20 could be any buckle and tongue that cooperate to selectively attach the first segment 14 and the second segment 16. For example, the buckle 18 and tongue 20 could be a buckle and tongue typically employed in an aircraft application, as shown in FIG. 1 or, alternatively, could be a buckle and tongue employed in an automotive application.

The first segment 14 may include a first end 22 that is attached to the buckle 18, a second end 24 that is attached to an anchor 26, and a main body 28 extending between the first end 22 and the second end 24. The first end 22 may be received within a portion of the buckle 18 and may be stitched or otherwise attached to itself following insertion of the first end 22 into the buckle 18 to attach the first end 22 of the first segment 14 to the buckle 18. Likewise, the second end 24 may pass through an opening 30 of the anchor 26 prior to being stitched or otherwise attached to itself to attach the second end 24 of the first segment 14 to the anchor 26. The main body 28 extends generally between the buckle 18 and the anchor 26 and may be formed from a woven material such as, for example, seatbelt webbing or airbag-cushion material. The anchor 26 may be attached to an external structure to fix the anchor 26 and, thus, the second end 24 of the first segment 14 relative to the external structure. For example, the anchor 26 may be attached to a seat structure (FIGS. 9-12) or, alternatively, to a portion of a mobile platform such as an automotive vehicle or aircraft (neither shown) that supports the seat structure.

The second segment 16 may include a first end 32, a second end 34, an anchor 36, and a main body 38 extending generally between the tongue 20 and the anchor 36. The first end 32 may be received in an opening 40 of the tongue 20 and may be stitched or otherwise attached to itself following insertion into the opening 40 to attach the first end 32 of the second segment 16 to the tongue 20. Likewise, the second end 34 may be inserted into an opening 42 of the anchor 36 and may subsequently be stitched or otherwise attached to itself following insertion of the second end 34 into the opening 42 to attach the second end 34 to the anchor 36. As with the first segment 14, the anchor 36 may be attached to an external structure to fix the anchor 36 and, thus, the second end 34 of the second segment 16 relative to the external structure. For example, the anchor 36 may be attached to a seat structure (FIGS. 9-12) or, alternatively, to a portion of a mobile platform such as an automotive vehicle or aircraft (neither shown) that supports the seat structure.

The main body 38 may extend between the tongue 20 and the anchor 36 and may be formed from an airbag-cushion material. Specifically, the main body 38 may be formed from a cut-and-sewn airbag-cushion material, a one-piece woven (OPW) airbag-cushion material, or a laminate airbag-cushion material. Because the first end 32 and the second end 34 of the second segment 16 may be integrally formed with the main body 38, the first end 32 and the second end 34 may likewise be formed from an airbag-cushion material. Alternatively, the main body 38 could include a portion formed from conventional seatbelt webbing (not shown) and a portion formed from airbag-cushion material, as will be described below.

While the restraint device 10 will be described and shown hereinafter as including a second segment 16 associated with a tongue 20 and including a main body 38 being formed from an airbag-cushion material, the restraint device 10 could alternatively or additionally be constructed such that the first segment 14 includes a main body formed from an airbag-cushion material. Further, while the first segment 14 will be described and shown as including a main body 28 formed from seatbelt webbing, the first segment 14 could alternatively be configured such that the buckle 18 is disposed in close proximity to the anchor 26 and is rigidly attached to the anchor 26, as would commonly be found in an automotive application. For example, the anchor 26 could be rigidly attached to the buckle 18 via a bracket or Bowden cable in an automotive seat (not shown) where the buckle 18 is positioned in close proximity to a seat bottom (not shown) of the automotive seat. If the buckle 18 is positioned in close proximity to a seat bottom of a seat assembly, the main body 38 of the second segment 16 would be elongated to allow the main body 38 to extend over an occupant while concurrently allowing the tongue 20 to be selectively received by the buckle 18.

The main body 38 extends between the tongue 20 and the anchor 36 and may include a belt portion 44 and an inflatable or cushion portion 46. The belt portion 44 and the cushion portion 46 may be formed from any of the above-described airbag-cushion materials and, further, may be formed from the same airbag-cushion material. Alternatively, the belt portion 44 could be formed from conventional seatbelt webbing while the cushion portion 46 is formed from airbag-cushion material to provide the first segment with an airbag movable from a pre-deployed state to an inflated state. In this configuration, the cushion portion 46 is attached to the belt portion 44 via a suitable process such as stitching and is folded relative to the belt portion 44 when in the pre-deployed state. While the belt portion 44 and the cushion portion 46 could be formed from the same or different materials, the belt portion 44 and the cushion portion 46 will be described and shown hereinafter as including a unitary construction, whereby the belt portion 44 and the cushion portion 46 are formed from the same piece of airbag-cushion material (FIG. 1).

Figure 2:
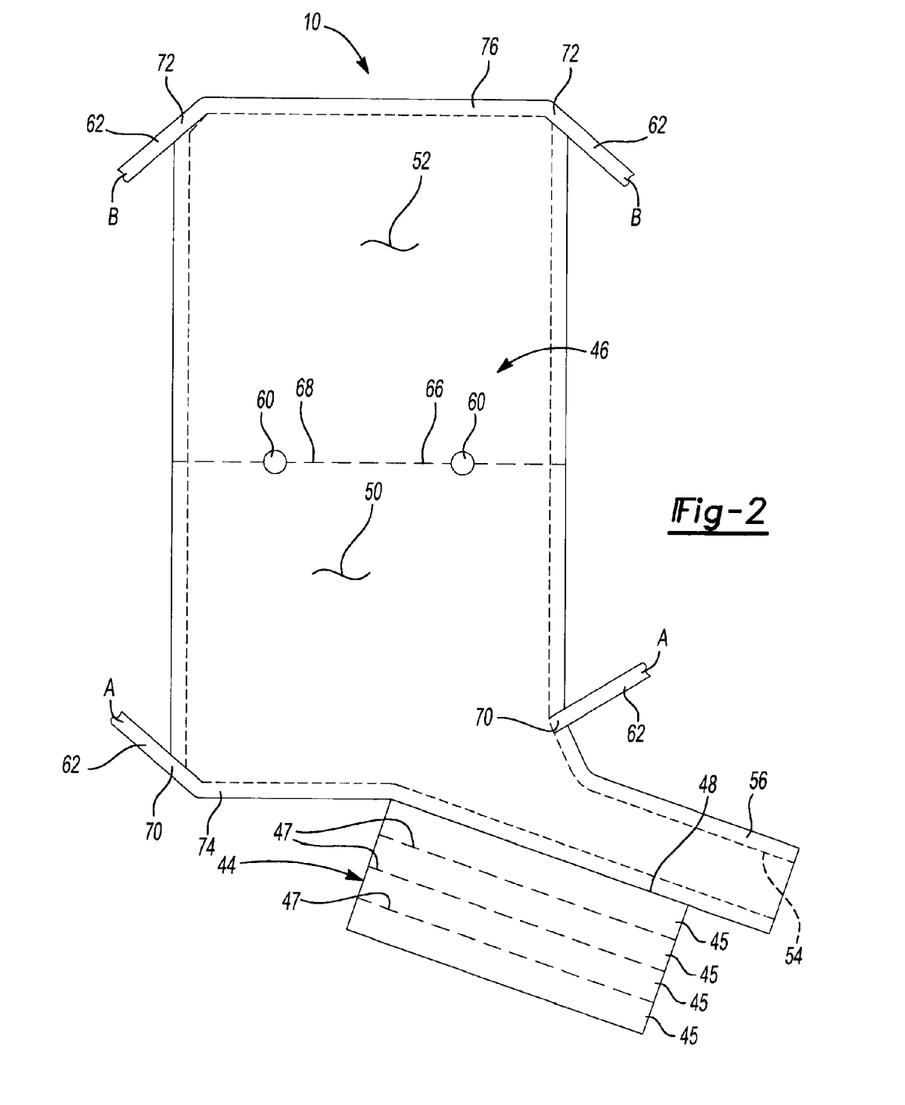
FIG. 2 is a partial plan view of the restraint device of FIG. 1 in a deployed but un-inflated state to illustrate the shape and configuration of a cushion portion of the restraint device.

The belt portion 44 may extend between the tongue 20 and the anchor 36 to permit forces applied to the main body 38 at the tongue 20 to be transmitted to the anchor 36 via the belt portion 44. Because the belt portion 44 serves to transmit forces from the tongue 20 to the anchor 36, the belt portion 44 must be formed from a sufficiently strong airbag-cushion material that is capable of transmitting forces from the tongue 20 to the anchor 36 without tearing. For example, the airbag-cushion material may be a so-called tight-matrix weave that provides sufficient strength to the main body 38 to allow the belt portion 44 to adequately transmit forces from the tongue 20 to the anchor 36 without tearing. Further, multiple layers or folded layers 45 (FIG. 2) of the airbag-cushion material may be folded along fold lines 47 to provide the belt portion 44 with a desired shape and tensile strength.

The cushion portion 46 may be formed from the same material as the belt portion 44 and, further, may be integrally formed with the belt portion 44 such that the cushion portion 46 is formed from the same piece of airbag-cushion material. The cushion portion 46 may extend from the belt portion 44 at a junction 48 (FIG. 2) of the belt portion 44 and the cushion portion 46. The junction 48 may fluidly isolate the belt portion 44 from the cushion portion 46 or, alternatively, may permit fluid communication between the belt portion 44 and the cushion portion 46. Should the junction 48 provide fluid communication between the belt portion 44 and the cushion portion 46, a portion of the belt portion 44 may be inflated when the cushion portion 46 is inflated.

While the cushion portion 46 is described as being formed from the same material as the belt portion 44, the cushion portion 46 and the belt portion 44 may include different weave patterns and, further, may be formed from different material types to provide the respective portions 44, 46 with different strength and/or elongation properties. Specifically, the belt portion 44 and the cushion portion 46 are described as being part of the main body 38 and, thus, as being formed from a cut-and-sewn airbag-cushion material, an OPW airbag-cushion material, or a laminate airbag-cushion material. As such, the belt portion 44 and the cushion portion 46 may both be formed from the same type of material (i.e., a cut-and-sewn airbag-cushion material, OPW airbag-cushion material, or a laminate airbag-cushion material) or, alternatively, may be formed from different types of material. For example, the belt portion 44 could be formed from an OPW airbag-cushion material while the cushion portion 46 is formed from a laminate airbag-cushion material. The particular weave of each portion 44, 46 and the type of material chosen for each portion 44, 46 may be tailored to provide each portion 44, 46 with a desired strength and/or elongation property. As such, any combination of material type and weave may be selected including forming each portion 44, 46 from a material having an identical weave pattern and material type.

The cushion portion 46 may extend from the belt portion 44 at the junction 48 and may include a first contact surface 50, a second contact surface 52, and an opening 54 located at a distal end of a throat 56 of the cushion portion 46. The first contact surface 50 may be positioned relative to the belt portion 44 such that when the cushion portion 46 is inflated, the first contact surface 50 opposes an occupant (FIGS. 9-12). The second contact surface 52 may be formed at an angle ($\Theta$)

relative to the first contact surface 50 and may react against the surrounding structure (not shown) of the mobile platform in which the restraint device 10 is installed. For example, the second contact surface 52 may be formed at an angle (Θ) greater than one-hundred and eighty degrees (180°) relative to the first contact surface 50 when the cushion portion 46 is moved from the pre-deployed state to the inflated state. In this position, the second contact surface 52 may react against a seatback of a seat assembly (neither shown), for example, disposed in front of an occupant (FIGS. 9-12) to fill a void between the occupant and the seatback. In other words, the second contact surface 52 may engage a seatback or other surrounding structure of a mobile platform to properly position and support the first contact surface 50 relative to the occupant.

The opening 54 may be disposed proximate to the junction 48 of the belt portion 44 and the cushion portion 46 and is in fluid communication with an interior of the cushion portion 46 to selectively supply the cushion portion 46 with pressurized gas. Specifically, the opening 54 may be in communication with an inflator (not shown) that selectively provides the cushion portion 46 with pressurized gas via the throat 56 to move the cushion portion 46 from the pre-deployed state to the inflated state.

Figure 13:
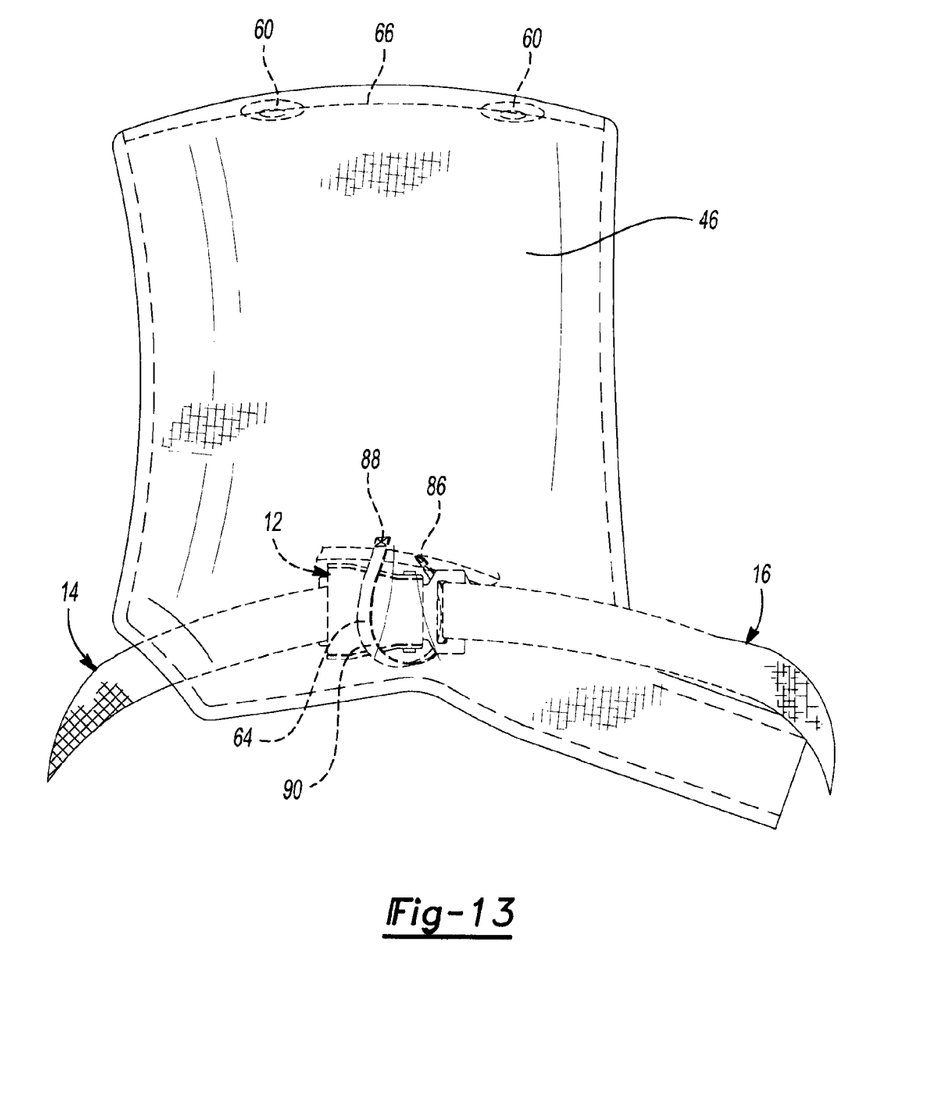
FIG. 13 is a perspective view of the restraint device of FIG. 1 in a fully inflated state.

The cushion portion 46 may additionally or alternatively include at least one so-called zero-length tether 60, at least one external tether 62, and/or a loop tether 64 (FIG. 13). The zero-length tether 60 may be located at a junction 66 of the first contact surface 50 and the second contact surface 52 and may be formed by stitching the material of the cushion portion 46 together or by weaving the material of the cushion portion 46 together to form a non-inflated area. Locally stitching the cushion portion 46 at the junction 66 prevents the junction 66—at the zero-length tethers 60—from inflating when the cushion portion 46 is moved from the pre-deployed state to the inflated state. As such, the zero-length tether 60 creates a bend line in the cushion portion 46 that defines the junction 66 and, thus, the first contact surface 50 and the second contact surface 52.

Use of the zero-length tether 60 also allows the first contact surface 50 and the second contact surface 52 to be formed from the same, unitary piece of airbag-cushion material and defines the shape and size of each surface 50, 52. For example, two or more zero-length tethers 60 may be located along an axis 68 (FIG. 2) that substantially bisects the cushion portion 46, thereby providing each contact surface 50, 52 with approximately the same size and shape.

The external tether 62 may be formed from the same material as the belt portion 44 and cushion portion 46 or, alternatively, may be formed from a different material. Regardless of the particular construction of the external tether 62, the external tether 62 may be attached to the cushion portion 46 at a first end 70 proximate to the first contact surface 50 and may be attached to the cushion portion 46 at a second end 72 proximate to the second contact surface 52. In one configuration, the first end 70 may be attached to the cushion portion 46 proximate to an end 74 disposed at an opposite end of the first contact surface 50 than the junction 66. Likewise, the second end 72 may be attached to the cushion portion 46 proximate to an end 76 disposed at an opposite end of the second contact surface 52 than the junction 66. Note that the external tether 62 is shown as being broken in FIG. 2 but actually extends between the first end 70 and the second end 72. Namely, point A is attached to or is integrally formed with point B (FIG. 2), as shown in FIG. 3, but is not illustrated as such in FIG. 2 to provide a substantially planar, un-inflated view of the cushion portion 46.

Figure 3:
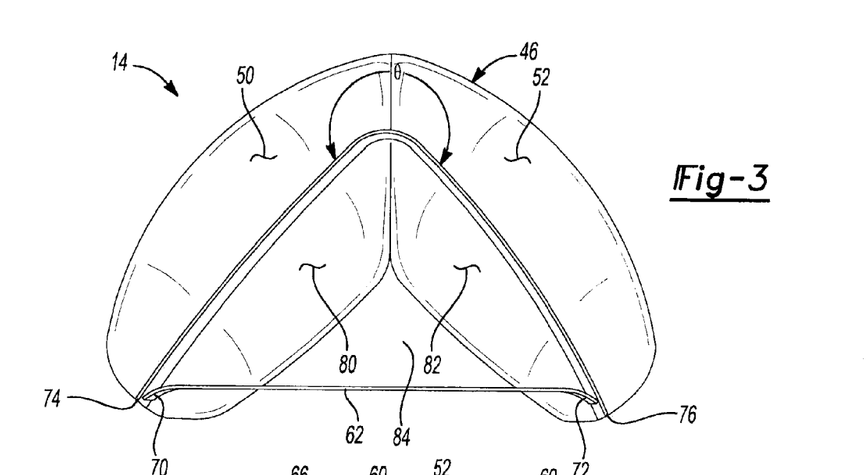
FIG. 3 is a side view of the restraint device of FIG. 1 in an inflated state.

Positioning the external tether 62 such that the ends 74, 76 of the cushion portion 46 are joined by the external tether 62 provides the cushion portion 46 with a substantially triangular shape when in the inflated state (FIG. 3). Specifically, the triangular shape of the cushion portion 46 may be formed by the first contact surface 50, the second contact surface 52, and the external tether 62. In one configuration, a pair of external tethers 62 could be positioned at opposite sides of the cushion portion 46 to maintain the triangular shape of the cushion portion 46 at both sides of the cushion portion 46 when in the inflated state. While the cushion portion 46 is described and shown as including a substantially triangular shape when in the inflated state, the cushion portion 46 could include virtually any shape when in the inflated state.

Figure 4:
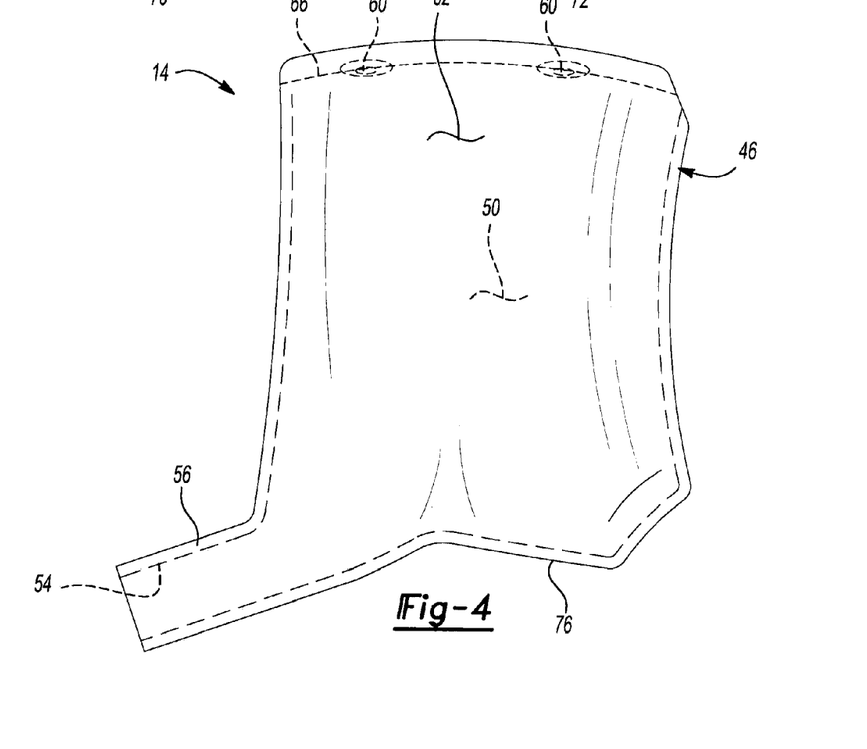
FIG. 4 is a front view of the restraint device of FIG. 1 in an inflated state.
Figure 5:
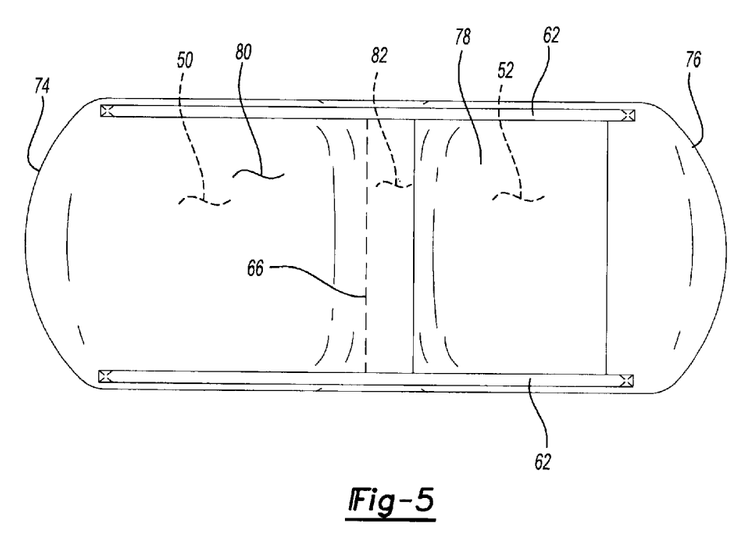
FIG. 5 is a bottom view of the restraint device of FIG. 1 in an inflated state illustrating a panel tether.

The cushion portion 46 may also include a panel tether 78 (FIG. 5) that extends between the pair of external tethers 62. Specifically, the panel tether 78 may extend between a pair of external tethers 62 such that the panel tether 78 opposes a first outer surface 80 and a second outer surface 82 of the cushion portion 46 when the cushion portion 46 is in the inflated state. As shown in FIGS. 3 and 4, the first outer surface 80 is formed on an opposite side of the cushion portion 46 than the first contact surface 50 and is substantially parallel to the first contact surface 50. Likewise, the second outer surface 82 is formed on an opposite side of the cushion portion 46 than the second contact surface 52 and is substantially parallel to the second contact surface 52. While the panel tether 78 is described as extending between the external tethers 62, the panel tether 78 could alternatively extend from end 74 to end 76.

When the cushion portion is in the inflated state, the first outer surface 80 and the second outer surface 82 may be in contact with one another in an area proximate to the junction 66. Further, each outer surface 80, 82 may oppose the panel tether 78 such that a void or gap 84 is disposed between and defined by the first outer surface 80, the second outer surface 82, and the panel tether 78 (FIG. 3). The panel tether 78 may be positioned along a length of each external tether 62 to allow the panel tether 78 to contact and react against an occupant's legs when the cushion portion 46 is in the inflated state. This way, the panel tether 78 serves to position the first contact surface 50 relative to an occupant when the cushion portion 46 is moved into the inflated state and further serves to act as a support for the cushion portion 46 (i.e., as a reaction surface) when the occupant loads the cushion portion 46.

With reference to FIG. 13, the loop tether 64 may be used to guide movement of the cushion portion 46 from the pre-deployed state to the inflated state and may include a first end 86 and a second end 88 that are both attached to the cushion portion 46. As with the external tether 62, the loop tether 64 may be constructed such that one of the first end 86 or the second end 88 is integrally formed with the cushion portion 46 to obviate the need to attach both ends 86, 88 to the cushion portion 46. The loop tether 64 may additionally include a main body 90 that extends generally between the first end 86 and the second end 88 and surrounds the belt portion 44. As with the zero-length tether 60 and external tether 62, the loop tether 64 acts to control the trajectory of the cushion portion 46 during and upon inflation.

The cushion portion 46 may include any or all of the zero-length tether 60, the external tether 62, and the loop tether 64. The cushion portion 46 may therefore utilize any or all of the zero-length tether 60, the external tether 62, and the loop tether 64 to control movement of the cushion portion 46 during and following inflation of the cushion portion 46 in an effort to properly position the first contact surface 50 of the cushion portion 46 relative to an occupant.

The cushion portion 46 may be folded and collapsed onto the belt portion 44 when the cushion portion 46 is in a pre-deployed state. Specifically, the cushion portion 46 may be folded in an accordion shape, for example, such that the cushion portion 46 includes a substantially rectangular profile. The folded cushion portion 46 may then be positioned adjacent to the belt portion 44 and may remain in close proximity to the belt portion 44 until the cushion portion 46 is inflated. While the cushion portion 46 is described as being folded in an accordion shape having a substantially rectangular profile, the cushion portion 46 could be folded in any manner and may include virtually any profile that permits the cushion portion 46 to properly move from the pre-deployed state to an inflated state within a desired time frame.

Once the cushion portion 46 is folded and is properly positioned relative to the belt portion 44, a cover 92 (FIG. 1) may surround an outer perimeter of the belt portion 44 and the cushion portion 46. The cover 92 may surround the belt portion 44 and the cushion portion 46 to retain a desired fold pattern of the cushion portion 46 and to maintain the cushion portion 46 in close proximity to the belt portion 44 until the cushion portion 46 is inflated. The cover 92 may include a tear seam (not shown) that provides a localized region of weakness to allow the cushion portion 46 to initially move in a desired direction upon inflation of the cushion portion 46. In one configuration, the tear seam of the cover 92 may be positioned to direct the cushion portion 46 in a direction substantially perpendicular to a longitudinal axis of the belt portion 44 to encourage inflation of the cushion portion 46 in a direction generally away from the belt portion 44. Further, the cushion portion 46 may be stitched to the belt portion 44 via break stitches (none shown) that break upon inflation of the cushion portion 46. Such break stitches may be used in place of or in conjunction with the cover 92 to retain the relative position of the belt portion 44 and cushion portion 46 when the cushion portion 46 is in the pre-deployed state.

Figure 6:
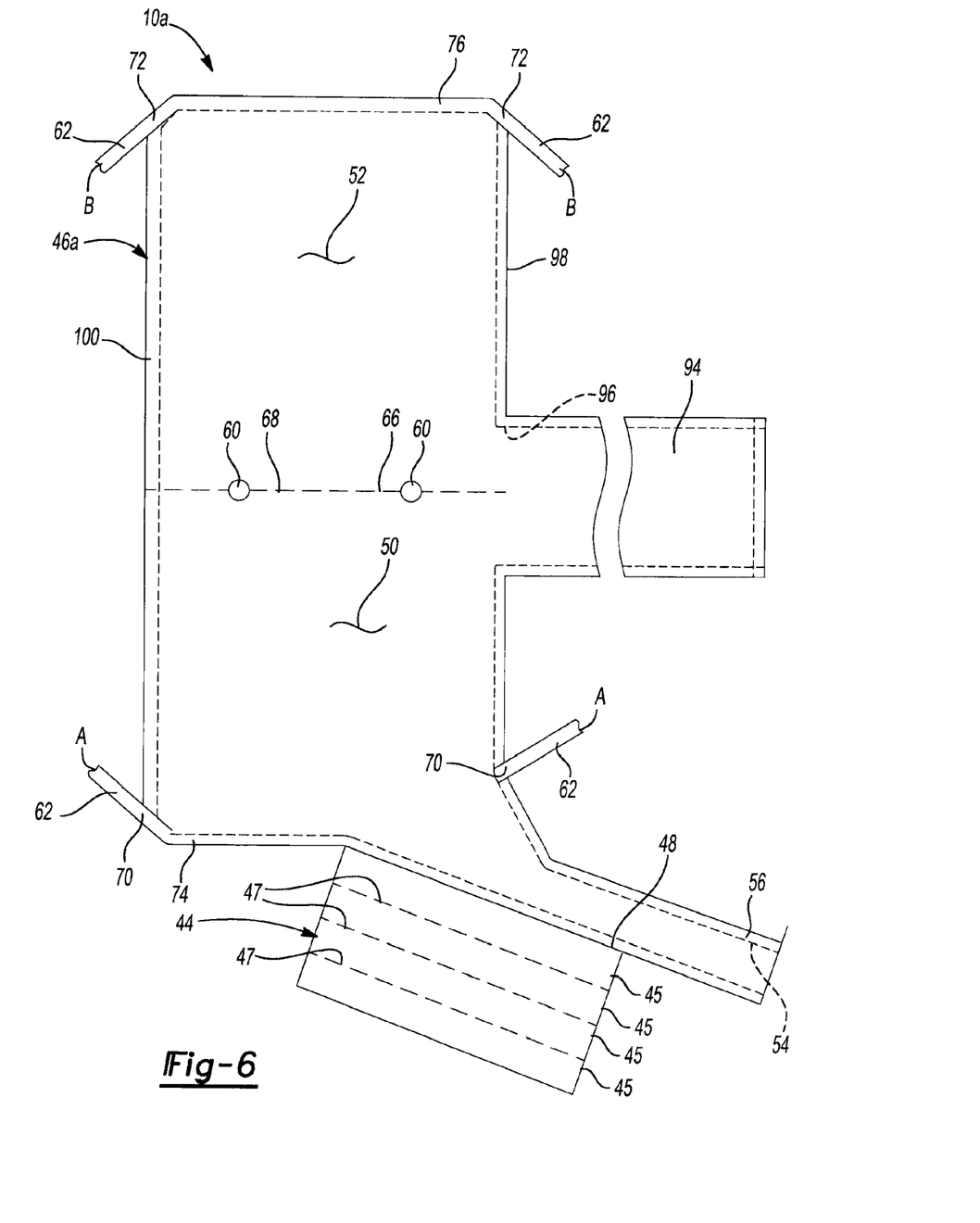
FIG. 6 is a partial plan view of the restraint device of FIG. 1 showing an alternate cushion portion in a deployed but un-inflated state to illustrate the shape and configuration of the alternate cushion portion.
Figure 7:
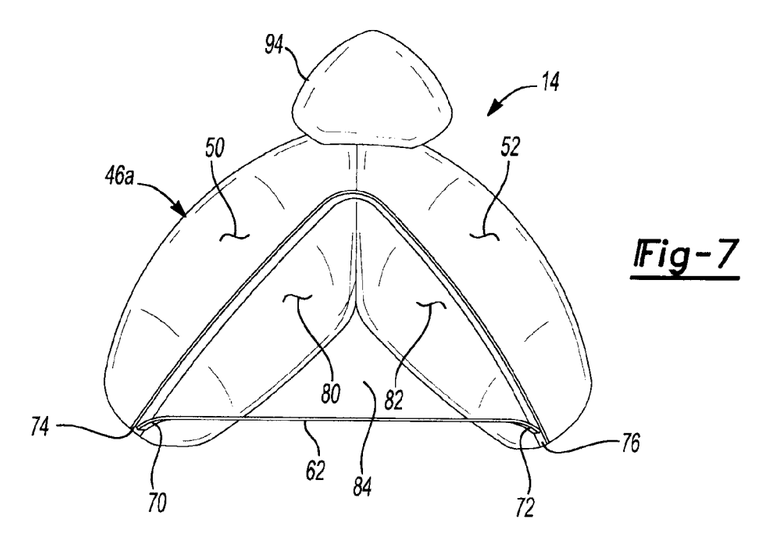
FIG. 7 is a side view of the restraint device of FIG. 6 in an inflated state.
Figure 8:
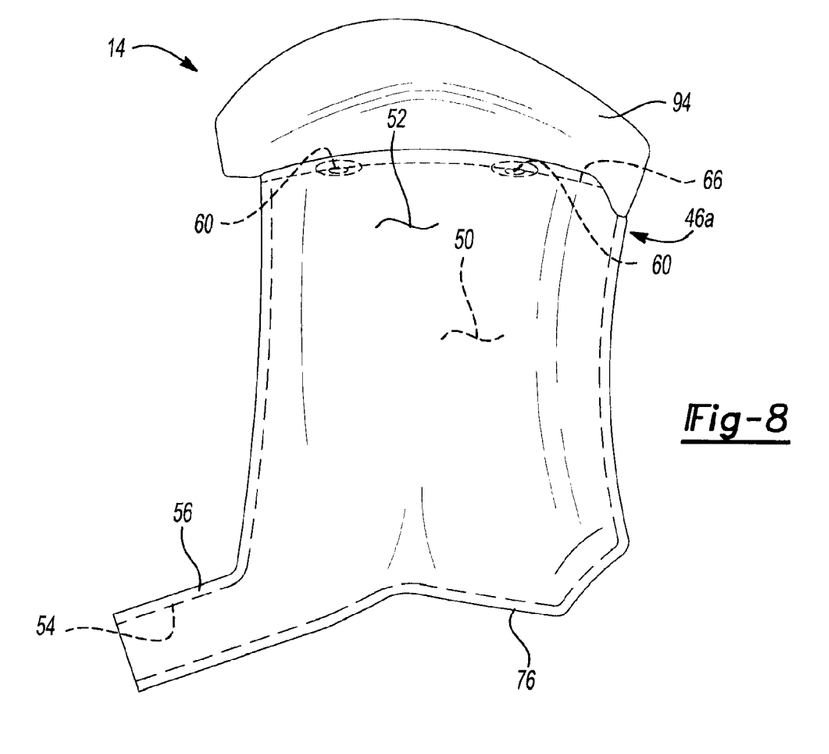
FIG. 8 is a front view of the restraint device of FIG. 6 in an inflated state.

With particular reference to FIGS. 6-8, another restraint device 10a is provided. In view of the substantial similarity in structure and function of the components associated with the restraint device 10 with respect to the restraint device 10a, like reference numerals are used hereinafter and in the drawings to identify like components while like reference numerals containing letter extensions are used to identify those components that have been modified.

The restraint device 10a is substantially identical to the restraint device 10. Specifically, the restraint device 10a may include each of the features of the restraint device 10, but may additionally include an additional inflatable section or tube 94 disposed proximate to the junction 66 of the first contact surface 50 and the second contact surface 52. As shown in FIG. 6, the tube 94 may be integrally formed with the first contact surface 50 and the second contact surface 52 and, thus, may be formed from the same airbag-cushion material as the first contact surface 50 and second contact surface 52. Alternatively, the tube 94 may be formed from a different airbag-cushion material and/or may include a different weave pattern than the first contact surface 50 and the second contact surface 52. Further, while the tube 94 is described and shown as being integrally formed with the first contact surface 50 and the second contact surface 52, the tube 94 could alternatively be attached to the first contact surface 50 and the second contact surface 52 via stitching.

Regardless of whether the tube 94 is integrally formed with the first contact surface 50 and the second contact surface 52, the tube 94 may include a passageway 96 that is in fluid communication with the cushion portion 46a. As such, when the cushion portion 46a receives high-pressure gas from the inflator and is moved from the pre-deployed state to the inflated state, the tube 94 likewise receives high-pressure gas and is moved from a pre-deployed state to an inflated state. In one configuration, when the tube 94 is in the inflated state, the tube 94 extends across and is in contact with at least a portion of the junction 66 disposed between the first contact surface 50 and the second contact surface 52. As such, the tube 94 is in contact with and is attached to a first side 98 and a second side 100 of the cushion portion 46a.

While the tube 94 is only shown as being in fluid communication with the inflatable portion 46a at the first side 98 (FIG. 6), the tube 94 could be in fluid communication with the inflatable portion 46a at both sides 98, 100. Regardless of whether the tube 94 is in fluid communication with both sides 98, 100, the tube 94 may be attached to both sides 98, 100 to properly position and maintain the tube 94 proximate to the junction 66.

Once the tube 94 is inflated, the tube 94 may be positioned relative to the junction 66 such that the tube 94 extends away from the junction 66. The tube 94 may be positioned relative to the junction 66 to receive a head of an occupant when the cushion portion 46a is moved from the pre-deployed state to the inflated state in an effort to absorb energy associated with the head contacting the cushion portion 46a.

With particular reference to FIGS. 9-13, operation of the restraint device 10 will be described in detail. As described above, the restraint device 10a is substantially identical to the restraint device 10 and, as such, a detailed description of the operation of the restraint device 10a is foregone.

When the restraint device 10 is in the pre-deployed state (FIG. 9), the first segment 14 and the second segment 16 span a lap portion of an occupant 102 seated in a seat assembly 104. In this position, the cushion portion 46 is in the pre-deployed state and is received and maintained within the cover 92 until a mobile platform in which the seat assembly 104 is installed experiences an impact event.

When the mobile platform experiences an impact event, an electrical signal may be supplied to the inflator, thereby causing the inflator to generate high-pressure gas. The high-pressure gas generated by the inflator is received by the throat 56 of the cushion portion 46, thereby causing the cushion portion 46 to move from the pre-deployed state to the inflated state.

The shape of the cushion portion 46 is controlled by the zero-length tethers 60, the external tether 62, and the loop tether 64. Namely, if the cushion portion 46 includes at least two zero-length tethers 60 disposed along the same axis at the junction 66, the zero-length tethers 60 define two non-inflated areas at the junction 66. Creating non-inflated areas at the junction 66 creates a bend line at the junction 66 which, in turn, causes the cushion portion 46 to bend at the junction 66 such that the first contact surface 50 and second contact surface 52 are disposed at an angle ($\Theta$) relative to one another. In one configuration, the angle formed between the first contact surface 50 and the second contact surface 52 is substantially equal to one hundred and eighty degrees (180°).

The shape of the cushion portion 46 when in the inflated state is also controlled by the external tethers 62 and/or the panel tether 78. Namely, if the cushion portion 46 includes a pair of external tethers 62 disposed on opposite sides of the cushion portion 46, the external tethers 62 likewise causes the first contact surface 50 and the second contact surface 52 to be positioned at a desired angle relative to one another. In other words, the external tethers 62 are placed under tension when the high-pressure gas fills the cushion portion 46 which, in turn, restricts separation of the first outer surface 80 and the second outer surface 82 to only a predetermined amount. Restricting separation of the first outer surface 80 and the second outer surface 82 likewise positions the first contact surface 50 at a desired angle relative to the second contact surface 52 to position the first contact surface 50 relative to the occupant 102.

If the cushion portion 46 includes a panel tether 78, the panel tether 78 may extend between the external tethers 62 or, alternatively, in place of the external tethers 62 and, upon inflation of the cushion portion 46, reacts against legs of the occupant 102 to position the first contact surface 50 relative to the occupant 102.

Figure 9:
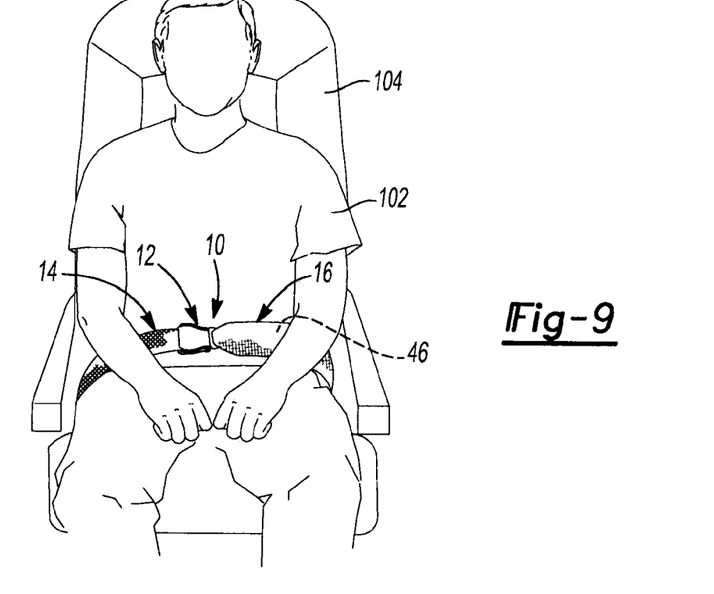
FIG. 9 is a perspective view of an occupant seated in a seat assembly incorporating the restraint device of FIG. 1 in a pre-deployed state.
Figure 10:
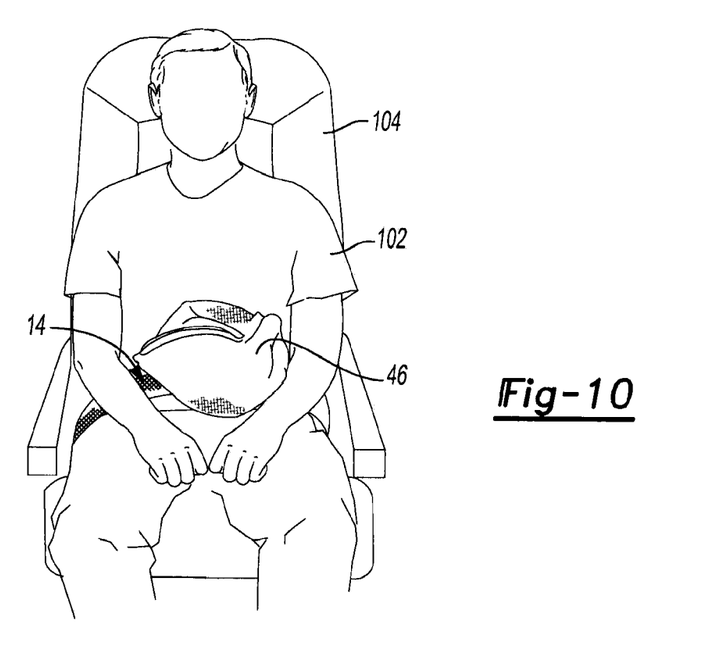
FIG. 10 is a perspective view of an occupant seated in a seat assembly incorporating the restraint device of FIG. 1 in a partially inflated state.
Figure 11:
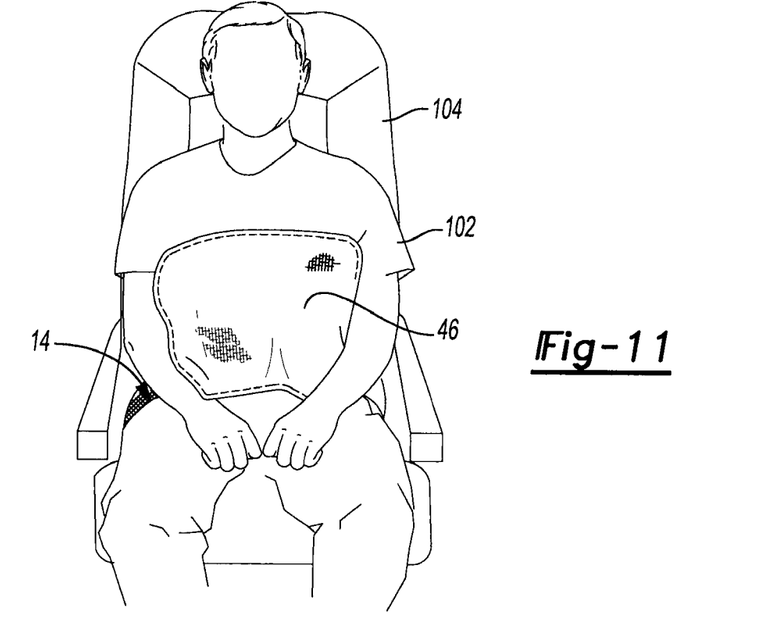
FIG. 11 is a perspective view of an occupant seated in a seat assembly incorporating the restraint device of FIG. 1 in a partially inflated state.
Figure 12:
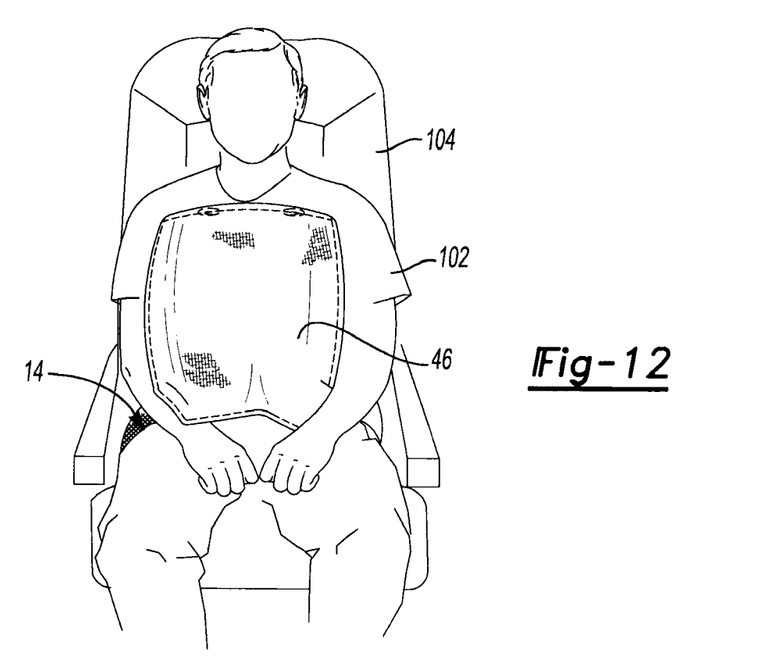
FIG. 12 is a perspective view of an occupant seated in a seat assembly incorporating the restraint device of FIG. 1 in a fully inflated state.

The loop tether 64 may cooperate with the first segment 14 and/or the second segment 16 to direct movement of the cushion portion 46 from the pre-deployed state to the inflated state (FIGS. 9, 10, and 13). Once the cushion portion 46 is in the inflated state (FIG. 11), the loop tether 64 may maintain engagement of the cushion portion 46 with the second segment 16.

When the cushion portion 46 is in the fully-inflated state, the first contact surface 50 may be properly positioned relative to the occupant 102 due to cooperation amongst the various tethers 60, 62, 64, which provide the cushion portion 46 with the shape shown in FIGS. 3 and 4. Likewise, the second contact surface 52 may contact surrounding structure of other seat assemblies and/or of the mobile platform to position the first contact surface 50 relative to the occupant 102. The panel tether 78 may likewise position the first contact surface 50 relative to the occupant 102 by reacting against the legs of the occupant 102 when the cushion portion 46 is moved from the pre-deployed state to the inflated state.

It will now be appreciated that the present teachings provide a safety restraint 10 having an increased-depth, low-volume cushion portion 46 for earlier occupant restraint and better occupant kinematics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A restraint system for a seat, the restraint system comprising:
a belt portion including an inflatable portion movable from a pre-deployed state to an inflated state, said inflatable portion including a first surface opposing an occupant when in said inflated state and a second surface facing away from the occupant when in said inflated state, said inflatable portion further including a third surface opposite said first surface and a fourth surface opposite said second surface, said third and fourth surfaces both being outer surfaces of the inflatable portion, said first surface and said second surface intersecting at a first junction, said first and second surfaces diverging from one another such that said inflatable portion has a substantially inverted V-shape when in said inflated state.

2. The restrain system of claim 1, wherein said first surface and said second surface diverge from one another as they extend from said junction when said inflatable portion is in said inflated state.

3. The restraint system of claim 1, wherein said first surface and said second surface are formed from a single, unitary piece of air-bag cushion material.

4. The restraint system of claim 1, wherein said third surface is substantially parallel to said first surface and a fourth surface is substantially parallel to said second surface.

5. The restraint system of claim 4, wherein said third surface is in contact with said fourth surface proximate to a second junction between said third surface and said fourth surface when said inflatable portion is in said inflated state.

6. The restraint system of claim 1, further comprising at least one tether disposed at said junction between said first surface and said second surface, said at least one tether causing said inflatable portion to bend at said junction.

7. The restraint system of claim 6, wherein said at least one tether is a non-inflated area of said inflatable portion.

8. The restraint system of claim 6, further comprising at least one external tether disposed externally from said inflatable portion and connecting said first surface and said second surface.

9. The restraint system of claim 8, wherein said at least one external tether cooperates with said first surface and said second surface to provide said inflatable portion with a substantially triangular shape when in said inflated state.

10. The restraint system of claim 8, wherein said external tether is a panel tether operable to react against legs of an occupant seated in the seat when said inflatable portion is in said inflated state.

11. The restraint system of claim 1, further comprising at least one external tether disposed externally from said inflatable portion and connecting said first surface and said second surface.

12. The restraint system of claim 1, further comprising an inflatable tube extending over said first junction of said first surface and said second surface when said inflatable portion is in said inflated state.

13. A restraint system for a seat, the restraint system comprising:
a belt portion including an inflatable portion movable from a pre-deployed state to an inflated state, said inflatable portion including at least one tether disposed at a junction of a first surface that opposes an occupant when in said inflated state and a second surface that faces away from the occupant when in said inflated state, said at least one tether causing said inflatable portion to bend at said junction.

14. The restraint system of claim 13, wherein said first surface and said second surface diverge from one another as they extend from said junction when said inflatable portion is in said inflated state.

15. The restraint system of claim 13, wherein said first surface and said second surface are formed from a single, unitary piece of air-bag cushion material.

16. The restraint system of claim 13, wherein said inflatable portion includes a third surface substantially parallel to and disposed on an opposite side of said inflatable portion than said first surface and a fourth surface substantially parallel to and disposed on an opposite side of said inflatable portion than said second surface.

17. The restraint system of claim 16, wherein said third surface is in contact with said fourth surface proximate to said junction when said inflatable portion is in said inflated state.

18. The restraint system of claim 13, wherein said at least one zero-length tether is a non-inflated area of said inflatable portion.

19. The restraint system of claim 13, further comprising at least one external tether disposed externally from said inflatable portion and connecting said first surface and said second surface.

20. The restraint system of claim 19, wherein said at least one external tether is attached to said first surface at an opposite end of said first surface than said junction and is attached to said second surface at an opposite end of said second surface than said junction.

21. The restraint system of claim 19, wherein said at least one external tether cooperates with said first surface and said second surface to provide said inflatable portion with a substantially triangular shape when in said inflated state.

22. The restraint system of claim 19, wherein said external tether is a panel tether operable to react against legs of an occupant seated in the seat when said inflatable portion is in said inflated state.

23. The restraint system of claim 13, further comprising an inflatable tube extending over said junction of said first surface and said second surface when said inflatable portion is in said inflated state.

\* \* \* \* \*